(12) United States Patent
Li

(10) Patent No.: US 12,456,944 B2
(45) Date of Patent: Oct. 28, 2025

(54) MOUNTING STRUCTURE OF PHOTOVOLTAIC PANEL

(71) Applicant: Shanghai Chiko Solar Technology Co., Ltd., Shanghai (CN)

(72) Inventor: Jinbei Li, Shanghai (CN)

(73) Assignee: Shanghai Chiko Solar Technology Co., Ltd., Shanghai (CN)

( * ) Notice: Subject to any disclaimer, the term of this patent is extended or adjusted under 35 U.S.C. 154(b) by 337 days.

(21) Appl. No.: 18/329,276

(22) Filed: Jun. 5, 2023

(65) Prior Publication Data

US 2023/0318521 A1 Oct. 5, 2023

(51) Int. Cl.
*H02S 20/23* (2014.01)
*H02S 20/30* (2014.01)

(52) U.S. Cl.
CPC .................... *H02S 20/30* (2014.12)

(58) Field of Classification Search
CPC ......... Y02E 10/47; Y02E 10/50; Y02B 10/10; H02S 20/23; H02S 30/10; F24S 25/636
See application file for complete search history.

(56) References Cited

U.S. PATENT DOCUMENTS

| | | | | |
|---|---|---|---|---|
| 8,640,401 B2 * | 2/2014 | Hong | ............ | F24S 25/636 |
| | | | | 52/173.3 |
| 8,919,075 B2 * | 12/2014 | Erickson | ............ | H10F 19/90 |
| | | | | 52/173.3 |
| 9,577,571 B2 * | 2/2017 | Atia | ............ | F24S 25/613 |
| 10,205,418 B2 * | 2/2019 | Nayar | ............ | F24S 25/60 |
| 10,340,838 B2 * | 7/2019 | Schuit | ............ | F24S 25/636 |
| 2010/0219304 A1 | 9/2010 | Miros et al. | | |
| 2012/0145228 A1 | 6/2012 | Miros et al. | | |
| 2018/0234046 A1 | 8/2018 | Saito et al. | | |
| 2023/0183970 A1 * | 6/2023 | Anderson | ............ | E04D 3/3605 |
| | | | | 52/746.11 |

\* cited by examiner

*Primary Examiner* — Brian E Glessner
*Assistant Examiner* — Daniel J Kenny
(74) *Attorney, Agent, or Firm* — Hemisphere Law, PLLC; Zhigang Ma

(57) ABSTRACT

The present disclosure provides a mounting structure of a photovoltaic panel, and relates to the technical of mounting of solar panels. The mounting structure includes a bottom plate, bases, supporting rails and clamps; the bases are fixedly mounted on the bottom plate; the supporting rails are detachably connected to the bases; the clamps slide on the supporting rails; the bases include mounting portions and supporting portions fixed on the mounting portions; side walls of the supporting rails are provided with side sliding chutes for fasteners to slide; top walls of the supporting rails are provided with top sliding chutes for the clamps to slide; and the clamps include sliding portions and clamping portions. In addition, a waterproof mud layer and the bottom plate are also arranged below the bases, so that the waterproof performance of the roof after the mounting of the photovoltaic panel can be better guaranteed.

10 Claims, 4 Drawing Sheets

MOUNTING STRUCTURE OF PHOTOVOLTAIC PANEL

TECHNICAL FIELD

The present disclosure relates to the field of photovoltaic technologies, specifically to a mounting structure of a photovoltaic panel.

BACKGROUND

With the population of solar power generation, demands for solar energy in the market are increasingly high, especially solar photovoltaic power generation, which cannot only be integrated into a power grid, but also alleviates a great electricity utilization burden. During mounting of a photovoltaic circuit board, it is more complex to mount a supporting frame of a photovoltaic panel, and there is a high requirement for a mounting environment. Especially for some old houses used for long time, there will be some pits on roof coverings of some roofs due to long-time service, so that photovoltaic panels easily tilt during mounting. After a photovoltaic panel is mounted for a long time, due to the action of gravity, a mounting base will deform or be damaged because of non-uniform pressure on the mounting base, which easily causes the photovoltaic panel to slide off, resulting in a serious potential safety hazard.

To sum up, the prior art obviously has inconvenience and defects in practical use, so it is necessary to improve the prior art.

SUMMARY

Embodiments of the present disclosure aim to provide a mounting structure of a photovoltaic panel, which can solve the technical problem of stable mounting of photovoltaic panels.

Embodiments of the present disclosure provide a mounting structure of a photovoltaic panel, including a bottom plate, bases, supporting rails and clamps; the bases are fixedly mounted on the bottom plate; the supporting rails are detachably connected to the bases; the clamps slide on the supporting rails; the bases include mounting portions and supporting portions fixed on the mounting portions; fixing members are arranged on the mounting portions; strip-type slots are also formed in the middles of the supporting portions; fasteners are arranged between the supporting portions and side walls of the supporting rails; the side walls of the supporting rails are provided with side sliding chutes for the fasteners to slide; top walls of the supporting rails are provided with top sliding chutes for the clamps to slide; and the clamps include sliding portions and clamping portions; the sliding portions are connected with the top sliding chutes; and the clamping portions resist against a top wall of the photovoltaic panel.

Further, side surfaces of the supporting portions and the side walls of the supporting rails are provided with corrugated teeth; the supporting portions and the mounting portions are also provided with reinforcers; the reinforcers are triangular; and the supporting portions, the reinforcers and the mounting portions are integrally formed.

Further, construction reference lines are arranged on the bottom plate; and alignment lines are arranged on the reinforcers.

Further, the fasteners include sliding blocks, screw rods and nuts; one end of each screw rod is connected with a middle portion of each sliding block; the other end of each screw rod penetrates through each strip-type slot; and the nuts used for pressing the supporting portions are also connected to the screw rods.

Further, guide bars are arranged in the side sliding chutes; and the sliding blocks slide in the side sliding chutes in a manner that side walls of the sliding blocks abut against the guide bars.

Further, waterproof mud layers are also attached to bottom surfaces of the mounting portions; through holes are formed in the mounting portions; and the fasteners penetrate through the mounting portions, the waterproof mud layers and the bottom plate in sequence; and lower ends of the fixing members extend out of the bottom plate.

Further, the sliding portions include fixture blocks and stoppers; the fixture blocks slide in the top sliding chutes; the stoppers are connected with upper ends of the fixture blocks; and the stoppers resist against the top walls of the supporting rails.

Further, the clamping portions include pressing members, bolts, sleeves and elastic members; the sleeves are fixed on the sliding portions; upper ends of the bolts penetrate through the pressing members; lower ends of the bolts are in threaded connection with the sleeves; and the elastic members are connected between lower ends of the pressing members and the sliding portions.

Further, the pressing members are U-shaped, and surfaces of the pressing members that are in contact with the photovoltaic panel are corrugated.

Further, the bases are made of 6005-T5 aluminum alloy material, and surfaces of the bases are anodized.

The present disclosure has the beneficial effects.

Due to the bottom plate, the bases, the supporting rails and the clamps in the present disclosure, the photovoltaic panel can be mounted on various uneven roofs with a plurality of pits. By mounting and adjusting the supporting portions and the supporting rails on the bottom plate, the photovoltaic panel can be adjusted to be kept on the same horizontal line after being mounted, which effectively ensures that the bases under the photovoltaic panel are uniformly stressed. In addition, the waterproof mud layers and the bottom plate are also arranged below the bases, so that the waterproof performance of the roof after the mounting of the photovoltaic panel can be better guaranteed.

By means of the structural design of the bases, which include the supporting portions and the mounting portions, and the overall structure of each base adopts the design of a tower supporting structure, which has high supporting strength, is convenient to mount and has low manufacturing cost.

Since the alignment lines are arranged on the bases, and the construction reference lines are arranged on the bottom plate, the efficiency of mounting the bases to the bottom plate is improved, and the overall tidiness after the mounting is guaranteed.

BRIEF DESCRIPTION OF THE DRAWINGS

In order to explain the technical solutions of the embodiments of the present disclosure more clearly, the following will briefly introduce the accompanying drawings used in the embodiments. It should be understood that the drawings in the following description only illustrate some embodiments of the present disclosure and thus shall not be deemed as limiting the scope. Those of ordinary skill in the art can obtain other related drawings based on these drawings without creative work.

Figure 1:
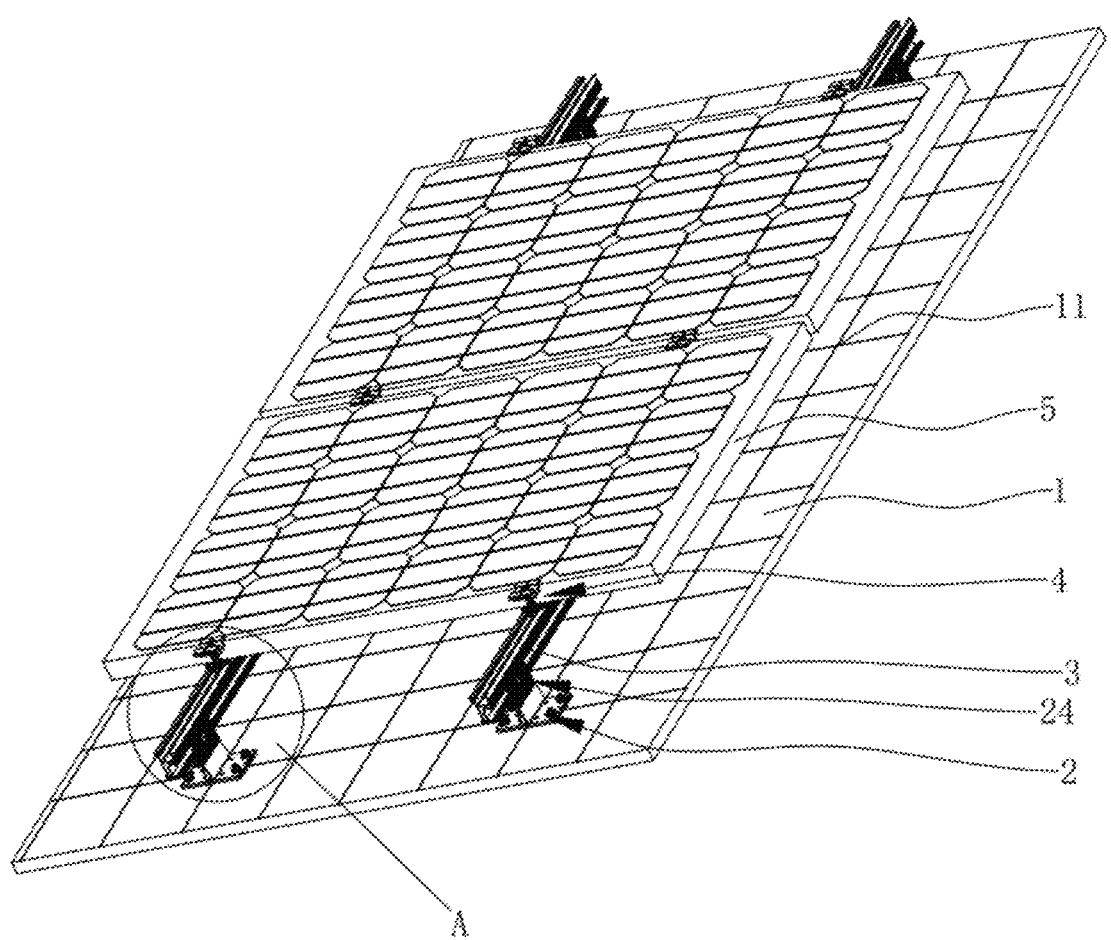
FIG. 1 is a schematic structural diagram of an embodiment of the present disclosure.

Numerals in the drawings are respectively as follows:

1: bottom plate; 11: construction reference line; 2: base; 21: mounting portion; 211: waterproof mud layer; 212: through hole; 22: supporting portion; 221: strip-type slot; 23: fixing member; 24: fastener; 241: sliding block; 242: screw rod; 243: nut; 25: reinforcer; 251: alignment line; 26: corrugated tooth; 3: supporting rail; 31: side sliding chute; 311: guide bar; 32: top sliding chute; 4: clamp; 41: sliding portion; 411: fixture block; 412: stopper; 42: clamping portion; 421: pressing member; 422: bolt; 423: sleeve; 424: elastic member; and 5: photovoltaic panel.

DETAILED DESCRIPTION OF THE EMBODIMENTS

In order to make the objectives, technical schemes and advantages of the embodiments of the present disclosure clearer, the technical schemes in the embodiments of the present disclosure will be described clearly and completely below in combination with the drawings in the embodiments of the present disclosure. Apparently, the embodiments described are part of the embodiments of the present disclosure, not all the embodiments. The components of the embodiments of the present disclosure generally described and shown in the drawings here can be arranged and designed in a variety of different configurations.

Therefore, the following detailed description for the embodiments of the present disclosure provided in the accompanying drawings is not intended to limit the scope of the claimed present disclosure, but merely represents selected embodiments of the present disclosure. Based on the embodiments in present disclosure, all other embodiments obtained by those of ordinary skill in the art without creative work shall fall within the protection scope of the present disclosure.

It should be noted that similar reference signs and letters indicate similar items in the following drawings. Therefore, once a certain item is defined in one drawing, it is unnecessary to be further defined and explained in the subsequent drawings.

In the description of the present disclosure, it should be noted that orientations or positional relationships indicated by the terms "center", "upper", "lower", "left", "right", "vertical", "horizontal", "inner" and "outer" are based on the orientations or positional relationships shown in the accompanying drawings, or the orientations or positional relationships where a product of the present disclosure is usually placed during use, which are only for the convenience of describing the present disclosure and simplifying the description, not intended to indicate or imply that the referred device or element must have a particular orientation and be constructed and operated in a particular orientation. Therefore, they should not be construed as a limitation to the present disclosure. In addition, the terms "first", "second", "third", etc. are only for the purpose of distinguishing descriptions, and may not be understood as indicating or implying the relative importance.

In addition, the terms "horizontal", "vertical", "overhang" and the like do not mean that the component is required to be absolutely horizontal or overhanging, but may be slightly inclined. For example, "horizontal" only means that its direction is more horizontal than "vertical", and it does not mean that the structure must be completely horizontal, but can be slightly inclined.

In the description of the present disclosure, it should be also noted that unless otherwise explicitly defined and defined, the terms "arranged", "mounted", "coupled", and "connected" shall be understood broadly, and may be, for example, fixedly connected, or removably connected, or integrally connected, or mechanically connected, or electrically connected, or directly connected, or indirectly connected through an intermediate medium, or interconnection between two elements. For those of ordinary skill in the art, the specific meanings of the above terms in the present disclosure can be understood according to specific situations.

Referring to FIG. 1 to FIG. 4, a mounting structure of a photovoltaic panel includes a bottom plate 1, bases 2, supporting rails 3 and clamps 4. The bottom plate 1 is placed on a roof. The bases 2 are fixedly mounted on the bottom plate 1 through fixing members 23. The supporting rails 3 are detachably connected to the bases 2 through fasteners 24. The clamps 4 slide on the supporting rails 3. By arranging the bottom plate 1, the bases 2, the supporting rails 3 and the clamps 4, the photovoltaic panel 5 can be mounted on various uneven roofs with a plurality of pits. By mounting and adjusting supporting portions 22 and the supporting rails 3 on the bottom plate 1, the photovoltaic panel 5 can be adjusted to be kept on the same horizontal line after being mounted, which effectively ensures that the bases 2 under the photovoltaic panel 5 are uniformly stressed. In addition, the bottom plate 1 is also arranged below the bases 2, so that the waterproof performance of the roof after the mounting of the photovoltaic panel can be better guaranteed.

Figure 2:
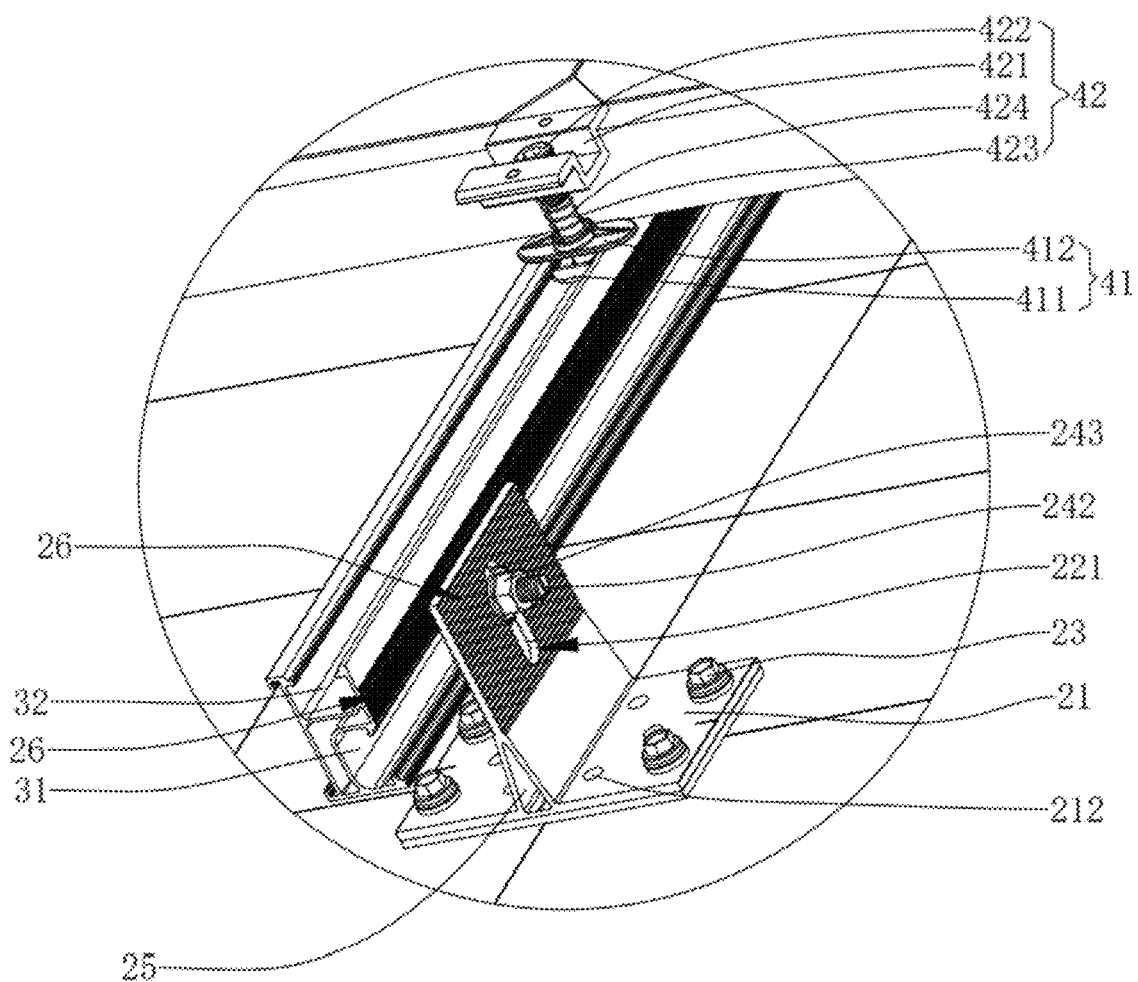
FIG. 2 is a schematic diagram of an enlarged structure of the part A in FIG. 1.
Figure 3:
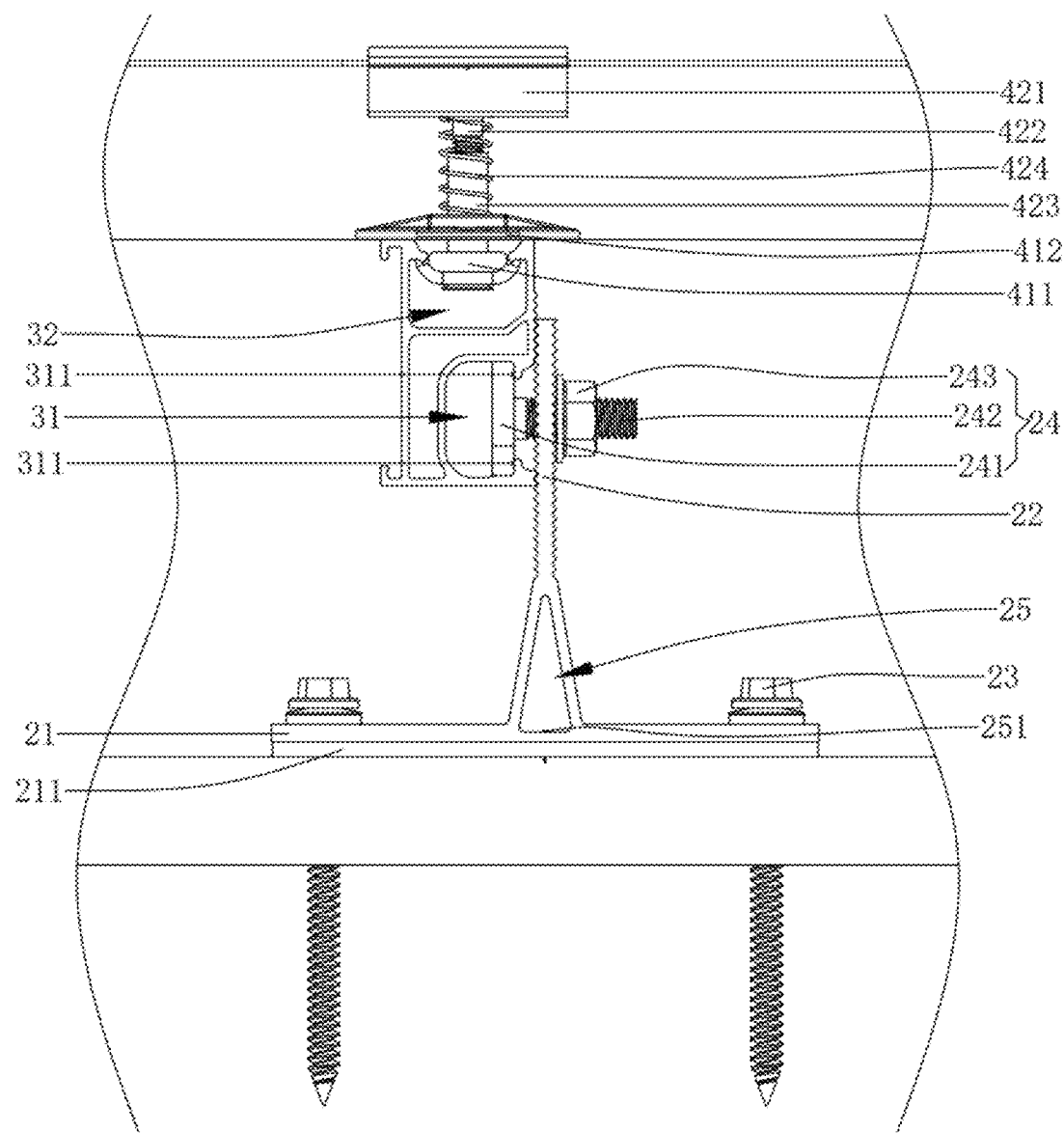
FIG. 3 is a schematic structural diagram of the structure shown in FIG. 1 along a direction.

Referring to FIG. 2 to FIG. 3, the base 2 includes a mounting portion 21 and a supporting portion 22 fixed on the mounting portions 21. The base 2 is made of a 6005-T5 aluminum alloy material, and a surface of the base 2 is anodized. The fixing members 23 are arranged on the mounting portion 21 in a penetrating manner. In this implementation, the fixing members 23 preferably use self-tapping screws. A strip-type slot 221 is also formed in the middle of the supporting portion 22. The strip-type slot 221 is a vertical waist slot. Corrugated teeth 26 are arranged on a side surface of the supporting portion 22 and a side wall of the supporting rail 3. A side wall of the supporting portion 22 and the side wall of the supporting rail 3 are relatively fixed by tightening the fastener 24. A reinforcer 25 is also arranged between the supporting portion 22 and the mounting portion 21. The reinforcer 25 is triangular. A bottom edge of the reinforcer 25 is connected with the mounting portion 21. A top of the reinforcer 25 is connected with the supporting portion 22. The supporting portion 22, the reinforcer 25 and the mounting portion 21 are integrally formed. A waterproof mud layer 211 is also stuck to a bottom surface of the mounting portion 21. The waterproof mud layer 211 is made of an Ethylene-Propylene-Diene Monomer (EPDM) material. A plurality of through holes 212 for the fixing member 23 to penetrate are formed in the mounting portion 21. The fastener 24 penetrates through the mounting portions 21, the waterproof mud layer 211 and the bottom plate 1 in sequence. Lower ends of the fixing members 23 extend out of the bottom plate 1. A lower end of the fastener 24 is in fastened connection with the roof through threads. By means of the structural design of the base 2, which includes the supporting portion 22 and the mounting portion 21, and the overall structure of the base 2 adopts the design of a tower supporting structure, which has high supporting strength, is convenient to mount and has low manufacturing cost. In addition, the waterproof mud layer 211 can better prevent rainwater from flowing in from the fastener 24, which better ensures the waterproof performance of the roof after the mounting of the photovoltaic panel.

Figure 4:
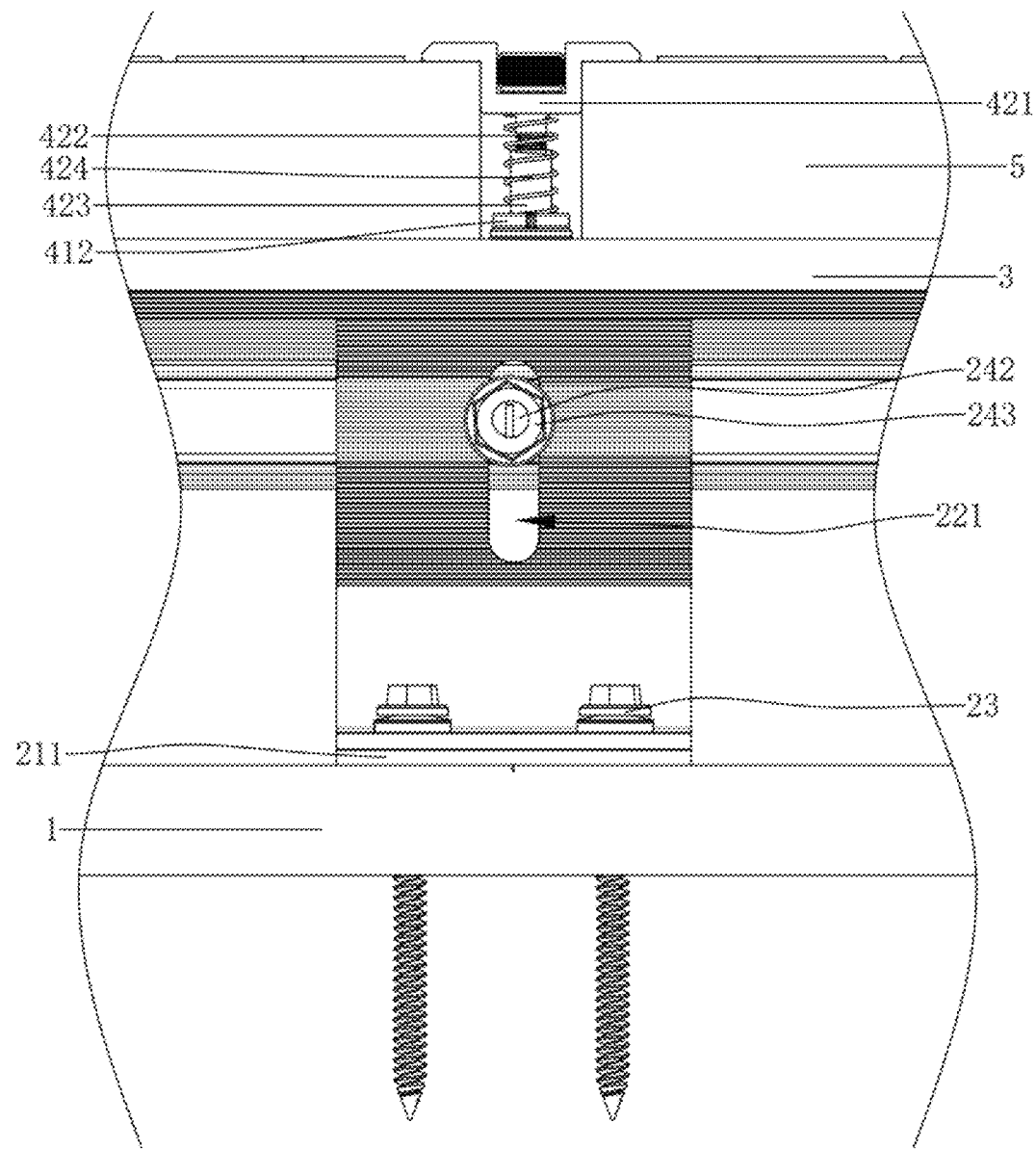
FIG. 4 is a schematic structural diagram of the structure shown in FIG. 1 along another direction.

Referring to FIG. 2 to FIG. 4, the fastener 24 includes a sliding block 241, a screw rod 242 and a nut 243. The sliding block 241 slides in side sliding chute 31. One end of the screw rod 242 is connected to the middle of the sliding block 241. The other end of the screw rod 242 penetrates through the strip-type slot 221. The nut 243 is also connected to the screw rod 242. An inner wall of the nut 243 resists against the side wall of the supporting portion 22.

Referring to FIG. 2 to FIG. 3, the side wall of the supporting rail 3 is provided with the side sliding chute 31 for the fastener 24 to slide. A top wall of the supporting rail 3 is provided with a top sliding chute 32 for the clamp 4 to slide. Upper and lower ends in the side sliding chute 31 are provided with guide bars 311. The sliding block 241 slides in the side sliding chute 31 in a manner that a side wall of the sliding block 241 abuts against the guide bars 311. Due to the arrangement of the guide bars 311, the sliding block 241 can slide in the side sliding chute 31 more stably.

Referring to FIG. 2 to FIG. 4, the clamp 4 includes a sliding portion 41 and a clamping portion 42. The sliding portion 41 is connected with the top sliding chute 32. The clamping portion 42 resists against a top wall of the photovoltaic panel 5. The sliding portion 41 includes a fixture block 411 and a stopper 412. The fixture block 411 slides in the top sliding chute 32. The stopper 412 is connected with an upper end of the fixture block 411. The stopper 412 resists against the top wall of the supporting rail 3. The clamping portion 42 includes a pressing member 421, a bolt 422, a sleeve 423 and an elastic member 424. In this embodiment, the sleeve 423 is fixed on the stopper 412. An upper end of the bolt 422 penetrate through the pressing member 421. A lower end of the bolt 422 is in threaded connection with the sleeve 423. The elastic member 424 is connected between a lower end of the pressing member 421 and the sliding portion 41. The elastic member 424 is preferably a spring. The pressing member 421 is U-shaped. The elastic member 424 is sleeved outside the sleeve 423 and the bolt 422. A surface of the pressing member 421 that is in contact with the photovoltaic panel 5 is corrugated. The bolt 422 is in threaded connection with the sleeve 423, and the bolt 422 resists against the pressing member 421, so that the photovoltaic panel 5 can be pressed on the supporting rail 3 in a fastener manner. An upward elastic force of the elastic member 424 makes the bolt 422 more in line with the pressing member 421, so that the bolt 422 will not rotate, which effectively ensures the fixing of the photovoltaic panel 5.

Referring to FIG. 1, construction reference lines 11 are transversely and longitudinally designed on the bottom plate 1. Alignment lines 251 are arranged in the middles of the reinforcers 25. The alignment lines 251 are arranged on the bases 2, and the construction reference lines 11 are arranged on the bottom plate 1, so that the efficiency of mounting the bases 2 to the bottom plate 1 is improved, and the overall tidiness after the mounting is guaranteed.

An implementation principle of the mounting structure of the photovoltaic panel according to the embodiment of the present disclosure is as follows: The bottom plate 1 is laid on a roof. The alignment lines 251 on the bases 2 are aligned with the construction reference lines 11 on the bottom plate 1. The fixing members 23 are knocked in to the bases 2, so that the bases 2 and the bottom plate 1 are fixed on the roof. The sliding blocks 241 slide into the side sliding chutes 31 of the supporting rails 3, and move to opposite positions. The screw rods 242 are threaded through the supporting portions 22 on the bases 2. The screw rods 242 can slide up and down in the strip-type slots 221. After the supporting rails 3 are adjusted to be horizontal, the nuts 243 are tightened to cause the corrugated teeth 26 of the supporting rails 3 to resist against the corrugated teeth 26 of the supporting portions 22. The fixture blocks 411 slide into the top sliding chutes 32 on the supporting rails 3, and after the parts of the clamping portions 42 are driven to corresponding positions, the photovoltaic panel 5 is placed on the supporting rails 3, and the fixture blocks 411 are then further moved till the pressing members 421 resist against the top of the photovoltaic panel 5. The bolts 422 are tightened to cause the pressing members 421 to resist against the top wall of the photovoltaic panel 5 in a fastened manner, thereby completing the mounting of the photovoltaic panel 5.

The above descriptions are merely preferred embodiments of the present disclosure and are not intended to limit the present disclosure. For those skilled in the art, the present disclosure may have various modifications and changes. Any modification, equivalent replacement, or improvement made without departing from the spirit and principle of the present disclosure shall fall within the protection scope of the present disclosure.

What is claimed is:

1. A mounting structure of a photovoltaic panel, comprising a bottom plate, bases, supporting rails and clamps, wherein the bases are fixedly mounted on the bottom plate; the supporting rails are detachably connected to the bases; the clamps slide on the supporting rails;
the bases comprise mounting portions and supporting portions fixed on the mounting portions; fixing members are arranged on the mounting portions; slots are formed in the middle of the supporting portions; fasteners are arranged between the supporting portions and side walls of the supporting rails;
the side walls of the supporting rails are provided with side sliding chutes for the fasteners to slide; top walls of the supporting rails are provided with top sliding chutes for the clamps to slide; and
the clamps comprise sliding portions and clamping portions; the sliding portions are connected with the top sliding chutes; and the clamping portions resist against a top wall of the photovoltaic panel.

2. The mounting structure of the photovoltaic panel according to claim 1, wherein side surfaces of the supporting portions and the side walls of the supporting rails are provided with corrugated teeth; the supporting portions and the mounting portions are also provided with reinforcers; the reinforcers are triangular; and the supporting portions, the reinforcers and the mounting portions are integrally formed.

3. The mounting structure of the photovoltaic panel according to claim 2, wherein construction reference lines are arranged on the bottom plate; and alignment lines are arranged on the reinforcers.

4. The mounting structure of the photovoltaic panel according to claim 1, wherein the fasteners comprise sliding blocks, screw rods and nuts; one end of each screw rod is connected to the middle of each sliding block; the other end of each screw rod penetrates through each strip-type slot; and the nuts used for pressing the supporting portions are also connected to the screw rods.

5. The mounting structure of the photovoltaic panel according to claim 4, wherein guide bars are arranged in the side sliding chutes; and the sliding blocks slide in the side sliding chutes in a manner that side walls of the sliding blocks abut against the guide bars.

6. The mounting structure of the photovoltaic panel according to claim 1, wherein waterproof layers are attached to bottom surfaces of the mounting portions; through holes are formed in the mounting portions; and the fasteners penetrate through the mounting portions, the waterproof layers and the bottom plate in sequence; and lower ends of the fixing members extend out of the bottom plate.

7. The mounting structure of the photovoltaic panel according to claim 1, wherein the sliding portions comprise fixture blocks and stoppers; the fixture blocks slide in the top sliding chutes; the stoppers are connected with upper ends of the fixture blocks; and the stoppers resist against the top walls of the supporting rails.

8. The mounting structure of the photovoltaic panel according to claim 1, wherein the clamping portions comprise pressing members, bolts, sleeves and elastic members; the sleeves are fixed on the sliding portions; upper ends of the bolts penetrate through the pressing members; lower ends of the bolts are in threaded connection with the sleeves; and the elastic members are connected between lower ends of the pressing members and the sliding portions.

9. The mounting structure of the photovoltaic panel according to claim 8, wherein the pressing members are U-shaped, and surfaces of the pressing members that are in contact with the photovoltaic panel are corrugated.

10. The mounting structure of the photovoltaic panel according to claim 1, wherein the bases are made of 6005-T5 aluminum alloy material, and surfaces of the bases are anodized.

* * * * *